Feb. 14, 1933.                M. P. QUAY                 1,897,861
                           CASING FOR KEY BOWS
                           Filed Aug. 25, 1931

M. P. Quay
INVENTOR
By: Marks & Clerk
         Attys.

Patented Feb. 14, 1933

1,897,861

UNITED STATES PATENT OFFICE

MARION PRYDE QUAY, OF ROME, ITALY

CASING FOR KEY-BOWS

Application filed August 25, 1931. Serial No. 559,287.

The object of my present invention is to provide an opensided envelope-like metal casing for covering the entire bow of a key of any kind, this casing being slipped on to the bow and held in position thereon by means of an open elastic ring.

The particular features of my said key bow casing consists in that a number, such as the number corresponding to that of the lock, is stamped or provided on the casing, also a name, such as the name of the proprietor of the key, and lastly depressions or cavities are formed on the casing, adapted to permanently receive a phosphorescent mass so as to make the key distinguishable even in the dark.

Figure 1:
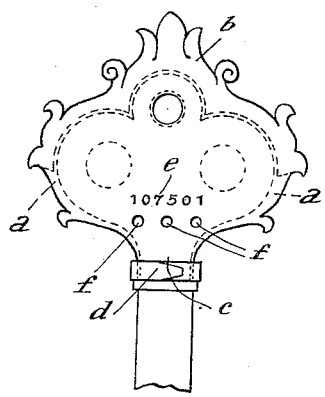

A structural form of my new metal casing is shown by way of illustrative, not limitative example in the annexed drawing in which Fig. 1 is a front view of key-bow with my new casing applied thereto.

Figure 2:
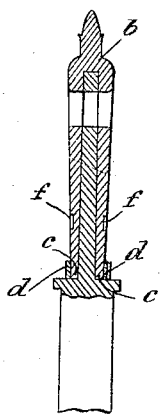

Fig. 2 is a vertical and

Figure 3:
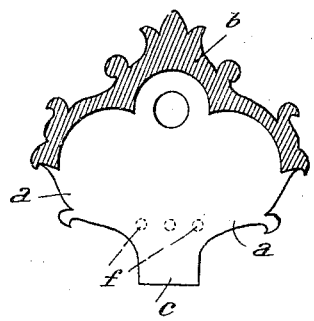

Fig. 3 a longitudinal section thereof.

With reference to the said drawing $a$ are the two sides of the casing integrally united together by the solid part $b$; $c$ the bottom ends of casing held together by split resilient ring $d$, $e$ the number of lock (or name of proprietor or user), $f$ the depression or cavities adapted for receiving the phosphorescent or other illuminating mass.

The ring $d$ engages around the sides $a$ and will prevent relative movement between the casing and the key-bow.

Having now particularly described the nature of my invention and in what manner the same is to be performed, I declare that what I claim is A key-bow casing comprising in combination a flat opensided envelope-like hollow metal body having two sides forming one piece, the connecting part being solid, a ring for retaining the sides of the casing in position, said casing having hollows provided on one side adapted to receive a phosphorescent mass, substantially as described and illustrated.

In testimony whereof I have hereunto signed my name.

MARION PRYDE QUAY.